United States Patent [19]
Guindani et al.

[11] Patent Number: 5,603,969
[45] Date of Patent: Feb. 18, 1997

[54] PRESS FOR THE INJECTION MOULDING OF PLASTIC MATERIALS WITH A DOUBLE-TOGGLE CLOSING UNIT

[75] Inventors: Sergio Guindani; Mario Spotti, both of Brescia; Mario Busi, Rezzato; Mario Fantoni, Brescia, all of Italy

[73] Assignee: Maicopresse S.p.A., Brescia, Italy

[21] Appl. No.: 426,709

[22] Filed: Apr. 24, 1995

[30] Foreign Application Priority Data

Apr. 26, 1994 [IT] Italy .................... BS94A0040

[51] Int. Cl.⁶ .................................... B29C 45/68
[52] U.S. Cl. .................... 425/593; 100/272; 100/286; 425/451.6
[58] Field of Search .................... 425/593, 451.6; 100/272, 286

[56] References Cited

U.S. PATENT DOCUMENTS 3,914,087  10/1975  Brocchi .................... 425/593
5,252,286  10/1993  Bugatti .................... 425/593

Primary Examiner—James P. Mackey
Attorney, Agent, or Firm—McGlew and Tuttle

[57] ABSTRACT

A press for the moulding of plastic materials (or for die-casting) of the type with a double-toggle closing unit, having an additional mobile plate (20) which is guided on columns (14) and can be moved between the closing plate (11) and the mobile mould-holder plate (13) and which has two opposing wings (20') outside the guiding columns (14) turned towards the closing plate (11) and such as to pass outside this when the additional plate (20) is moved towards the closing plate (11) to open the press. The toggles (18) are connected to said wings (20') of the additional plate (20) and turn folding themselves back towards the outside of the columns and towards the closing plate (11) when the additional plate moves from the press closing position to the opening position.

7 Claims, 1 Drawing Sheet

PRESS FOR THE INJECTION MOULDING OF PLASTIC MATERIALS WITH A DOUBLE-TOGGLE CLOSING UNIT

FIELD OF THE INVENTION

The present invention pertains to presses for the injection moulding of plastic materials of the type with a double-toggle closing unit, and more specifically it concerns an improvement in this closing unit for presses.

BACKGROUND OF THE INVENTION

These presses for injection moulding usually comprise a base and four horizontal columns arranged above the base, in conformity with the vertices of a quadrilateral, and which extend between a closing or reaction plate that can be positioned on the base and resting against reaction blocks applied at one end of the columns and a stationary mould-holder plate, fixed onto the base and resting against stop blocks at the other end of the columns. A mould-holder plate is conducted along the columns, guided on the base and displaceable towards and away from the fixed mould-holder plate.

In such presses, the locking/releasing movements to close the mobile mould-holder plate against the fixed mould-holder plate are obtained by means of a control unit, known as a double-toggle unit, composed of hinged rods or connecting rods extending and withdrawing when operated by at least one hydraulic cylinder.

On conventional presses, the toggles normally fold up towards the axis of the press, that is towards the inside of the columns. The rods or connecting rods of the toggles are connected on one side to the mobile mould-holder plate and on the other side to a mobile plate or to a so-called crosshead plate, operated by at least two power cylinders and conducted along an additional column between the horizontal guiding columns of the machine. However, the presence of a crosshead plate and/or additional columns between the main columns and especially the folding back of the toggles towards the axis of the machine, as well as obstructing access inside the structure for maintenance or otherwise, also limit the opening stroke of the mobile mould-holder mould. This limitation means that a press can be used only for bodies with a maximum depth in compatibility with the travel of the mobile mould-holder plate even though it could potentially be suitable for moulding even deeper bodies. In other words, for moulding deeper bodies it is then necessary to resort to larger, bulkier and more powerful presses, which are also more costly and which can have an adequate stroke for the requirements, even though in theory a smaller press, less bulkier and with a lower cost, being able to have a greater stroke, would be able to mould bodies as deep as the larger press.

SUMMARY AND OBJECTS OF THE INVENTION

It is an object of the present invention to obviate the disadvantageous characteristics and limitations of the above described presses for the injection moulding of plastic materials, by providing a new, original closing unit that permits attributing to the mobile mould-holder plate a longer, although adjustable, stroke.

Another object of the invention is to provide a press of the above mentioned type wherein the toggles on opening the machine fold back towards the outside and back at the sides of the closing or reaction plate which allows the mobile mould-holder plate to effectively move farther away from the fixed mould-holder plate so as to mould and extract much deeper bodies than those that can be moulded on conventional presses of the same class.

An additional object of the invention is to provide a press of the above mentioned type, wherein the toggles can be folded back towards the outside with the advantage of leaving the centre of the machine freer for positioning other organs connected with the mobile mould-holder plate and for access.

Yet another object of the invention is to provide a press of the above mentioned type, wherein the connecting rods of the toggles are controlled by a single hydraulic cylinder and, when extended, they are arranged coplanar with the horizontal columns for more effective and safer closing of the machine since, advantageously, the locking force is then discharged on the axis of the columns, basically with no components inducing bending moments in the columns themselves.

According to the invention, a press for the injection moulding of plastic materials (or for die-casting) of the type with a double-toggle closing unit, is provided including a closing or reaction plate, a stationary mould-holder plate and a mobile mould-holder plate spaced in parallel on a support base. The mobile mould-holder plate is placed between the closing plate and the stationary mould-holder plate. Four horizontal columns are arranged according to the vertices of a quadrilateral, connecting between them the closing plate with the stationary mould-holder plate and forming sliding guides for movement of the mobile mould-holder plate. Two toggle mechanisms are provided connecting the closing plate with the mobile mould holder plate through the additional plate so that the movements of the additional plate correspond to the extension and the folding back of the toggle mechanisms and respectively the movements of the mobile mould-holder plate (13) to close and open the press. The additional mobile plate is guided on the columns and can be moved between the closing plate and the mobile mould-holder plate by means of a hydraulic power cylinder placed on a longitudinal axis of the press, fixed to said closing plate and having a rod fixed to the center of the additional plate for the movements of the latter on the guiding columns. The additional plate has two opposing wings outside the guiding columns turned towards the closing plate and such as to pass and be outside this when said additional plate is moved towards the closing plate to open the press. The toggle mechanisms are connected to the wings of the additional plate and turn folding themselves back towards the outside of the columns and towards the closing plate when the additional plate moves from the press closing position to the opening position.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figures 1, 2:
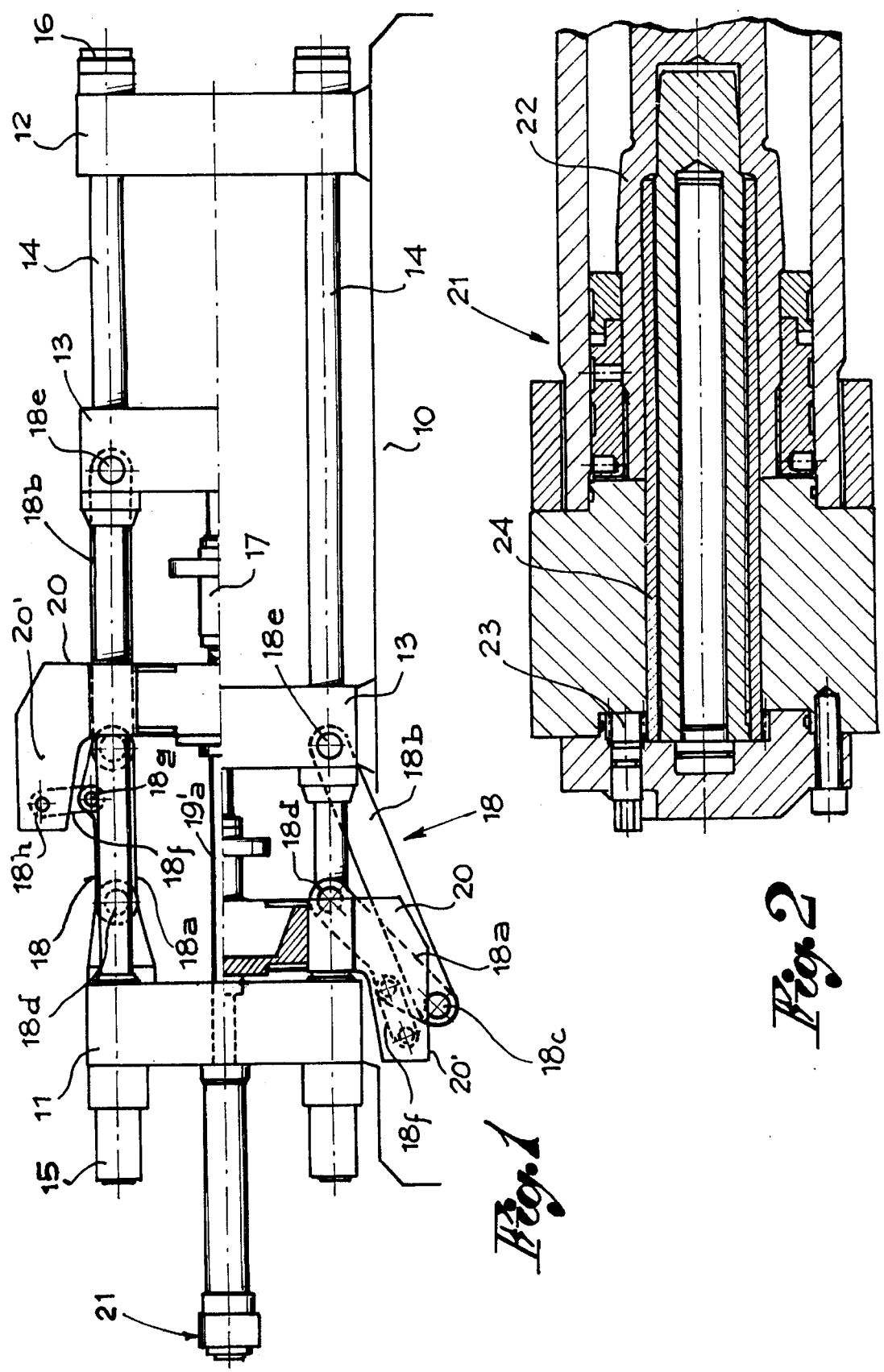
FIG. 1 is a schematic view in elevation that illustrates the essential components of a press with the top half in the closing position and the bottom half in the opening position.
FIG. 2 illustrates a cross-sectional view of a device for adjusting the opening stroke.

A machine for the injection moulding of plastic materials (or for die-casting) usually and essentially comprises a base 10 bearing a closing or reaction plate 11, a stationary mould-holder plate 12 and a mobile mould-holder plate 13, the latter placed between the closing plate 11 and the stationary mould-holder plate 12. The plates 11, 12 and 13 are in an upright arrangement and spaced in parallel along the base. The closing plate 11 and the stationary mould-holder plate 12 are connected by four horizontal columns 14 arranged according to the vertices of a quadrilateral and passing through the plates themselves.

More specifically, and as is moreover known, the closing plate 11 can be positioned on the base 10 and rests against adjustment blocks 15 applied at one end of the columns 14; the stationary mould-holder plate 12 is generally fixed onto the base 10 and rests against bed blocks 16 applied at the other end of the columns 14; the mobile mould-holder plate can be moved in closing and opening on the base and along the columns 14, respectively towards and away from the stationary mould-holder. On board the mobile mould-holder plate 13 there is an extractor apparatus 17 which in itself is known.

For the closing/opening movements, the mobile mould-holder plate 13 is connected to two toggle mechanisms 18, a top one and a bottom one, controlled by a hydraulic power cylinder 19 through an additional plate 20.

According to the invention, this additional plate 20 is conducted on the horizontal columns 14 between the reaction plate 11 and the mobile mould-holder plate 13. The additional plate 20 is provided with two wings 20' outside the columns 14, respectively above and below them. Said wings 20' of the additional plate 20 are turned towards the closing plate 11 and are such as to pass outside it, without any interference, when the additional plate 20 is moved towards the closing plate 11. In other words, when viewed sideways, the additional plate 20 basically has a "U" shape and its opposing wings 20' define between them a hollow 20" designed to receive and contain the closing plate 11 in height. This configuration permits the additional plate 20 to come close up to the closing plate 11 and at the same time allows the wings 20' to extend outside the closing plate, towards the back of the latter and so that the wings 20' go, if this is the case, beyond the closing plate approximately to the level of the adjustment blocks 15.

The hydraulic cylinder 19 that controls the toggles 18 is placed on the longitudinal axis of the press, it is fixed to the closing plate 11 and has a rod 19' fixed at the centre by the additional plate 20, onto the bottom of the hollow 20" of the latter.

Each toggle 18 is composed of a first and a second set of connecting rods 18a and 18b hinged at their ends contiguous at 18c. The connecting rods of a first set 18a are turned and hinged, at 18d, to lugs integral with the closing plate 11; the connecting rods of the second set 18b are turned and hinged at 18e to the mobile mould-holder plate 13.

The middle portion of the connecting rods of the first set 18a is then connected to the additional plate 20 by means of small connecting rods 18f.

More specifically, these small connecting rods 18f are hinged on one side, at 18g, to the connecting rods 18a and on the opposite side 18h to the wings 20' of the additional plate 20, close to the free ends of the wings themselves.

It should be noted that on every toggle 18 the hinging axes 18d and 18e of the two sets of connecting rods 18a and 18b, respectively to the closing plate 11 and the mobile mould-holder plate 13, are preferably placed on a horizontal plane containing the axes of two coplanar columns and so that when the connecting rods are extended to close the press, the connecting rods 18a and 18b are coplanar with said columns. Moreover, the arrangement of the connecting rods 18a, 18b and 18f forming the toggles 18 means that with the press open and with the mobile mould-holder plate 13 shifted back towards the closing plate 11, the connecting rods turn and fold back towards the outside of the columns 14.

In practice, the action of the power cylinder 19 determines the movements of the additional plate 20 along the columns 14 to extend the toggles 18 at the time of closing the press by means of the mobile mould-holder plate 13 coming up close to the stationary mould-holder plate 12, and to fold the toggles 18 back on opening the press by loosening the mobile mould-holder plate from the stationary mould-holder plate. On opening, the additional plate 20 can go back right up against the closing plate 11 and, thanks to the wings 20" of such an additional plate 20 passing outside the closing plate, the toggles can fold back effectively drawing back the mobile mould-holder plate with a stroke that cannot be obtained otherwise and in order to achieve the above mentioned objects.

Moreover, the stroke of the mobile mould-holder plate is adjustable by means of a device 21 as illustrated in FIG. 2 so as not to open the press fully when it is not necessary. Such a device is co-ordinated and placed on the axis of the hydraulic cylinder 19 and has an element 22 that can be positioned axially in the cylinder by means of the pinion 23 and of a screw organ 24 to act as a check for the ram in the cylinder 19 and thus limit the stroke.

We claim:

1. A press for injection moulding, comprising:

a closing plate;

a stationary mould-holder plate;

a mobile mould-holder plate spaced from said stationary mould-holder plate and disposed parallel to said stationary mould-holder plate, on a support base, said mobile mould-holder plate being positioned between said stationary mould-holder plate and said closing plate;

four horizontal columns arranged according to vertices of a quadrilateral to define a region inside a space defined by said columns, said horizontal columns connecting said closing plate with said stationary mould-holder plate and forming sliding guides for movement of said mobile mould-holder plate;

an additional plate;

two toggle mechanisms connecting said closing plate with said mobile mould-holder plate through said additional plate whereby movement of said additional plate corresponds to an extension and a folding back of said toggle mechanisms and respectively movements of said mobile mould-holder plate to close and open the press, said additional plate being guided on said columns and being movable between said closing plate and said mobile mould-holder plate;

a hydraulic power cylinder placed on a longitudinal axis of the press, said hydraulic power cylinder being fixed to said closing plate and being connected to said additional plate for moving said additional plate, said hydraulic power cylinder having a rod fixed to a center of said additional plate, said additional plate having two opposing wings disposed outside said region, said wings being turned towards said closing plate whereby said wings are positioned outside said closing plate when said additional plate is moved towards said closing plate to open the press, each of said toggle mechanisms being connected to one of said wings whereby said toggle mechanisms turn folding themselves back towards an outside of said region and towards the closing plate when said additional plate moves from a press closing position to a press opening position.

2. A press as claimed in claim 1, wherein said additional plate has substantially a "U" shape and said wings define between them a hollow designed to receive and contain said closing plate in height when said additional plate is alongside said closing plate, said rod of said hydraulic power cylinder being fixed on a bottom of said hollow.

3. A press as claimed in claim 1, wherein each of said toggle mechanisms comprises a first and a second set of connecting rods hinged at their contiguous ends and placed between two of said columns, wherein said connecting rods of a first set are hinged to said closing plate and said connecting rods of a second set are hinged to said mobile mould-holder plate, wherein a middle portion of connecting rods of said first set is connected to said wings of said additional plate by means of additional connecting rods, and wherein hinging axes of said connecting rods to said closing plate and to said mobile mould-holder plate are in a horizontal plane containing axes of two of said columns between which said connecting rods are placed, said connecting rods being coplanar with said two of said columns when they are extended to close the press.

4. A press as claimed in claim 1, wherein said hydraulic power cylinder is equipped with a device limiting a stroke of said hydraulic power cylinder, said device being placed coaxially with, extending itself into, said hydraulic cylinder.

5. A press as claimed in claim 2, wherein each of said toggle mechanisms comprises a first and a second set of connecting rods hinged at their contiguous ends and placed between two of said columns, wherein said connecting rods of a first set are hinged to said closing plate and said connecting rods of a second set are hinged to said mobile mould-holder plate, wherein a middle portion of connecting rods of said first set is connected to said wings of said additional plate by means of additional connecting rods, and wherein hinging axes of said connecting rods to said closing plate and to said mobile mould-holder plate are in a horizontal plane containing axes of two of said columns between which said connecting rods are placed, said connecting rods being coplanar with said two of said columns when they are extended to close the press.

6. A press as claimed in claim 2, wherein said hydraulic power cylinder is equipped with a device limiting a stroke of said hydraulic power cylinder, said device being placed coaxially with, extending itself into, said hydraulic cylinder.

7. A press as claimed in claim 3, wherein said hydraulic power cylinder is equipped with a device limiting a stroke of said hydraulic power cylinder, said device being placed coaxially with, extending itself into, said hydraulic cylinder.

* * * * *